(12) United States Patent
Martinez et al.

(10) Patent No.: US 6,564,330 B1
(45) Date of Patent: May 13, 2003

(54) WAKEUP CIRCUIT FOR COMPUTER SYSTEM THAT ENABLES CODEC CONTROLLER TO GENERATE SYSTEM INTERRUPT IN RESPONSE TO DETECTION OF A WAKE EVENT BY A CODEC

(75) Inventors: Alberto J. Martinez, El Dorado Hills, CA (US); David I. Poisner, Folsom, CA (US); Karthi R. Vadivelu, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,096

(22) Filed: Dec. 23, 1999

(51) Int. Cl.[7] .................................................. G06F 1/26
(52) U.S. Cl. ....................................................... 713/322
(58) Field of Search .................................. 713/300, 323

(56) References Cited

U.S. PATENT DOCUMENTS

| | | | |
|---|---|---|---|
| 6,263,075 B1 * | 7/2001 | Fadavi-Ardekani et al. | 379/387.01 |
| 6,272,645 B1 * | 8/2001 | Wang | 713/323 |
| 6,275,947 B1 * | 8/2001 | Wang | 713/300 |
| 6,408,351 B1 * | 6/2002 | Hamdi et al. | 710/63 |
| 6,408,396 B1 * | 6/2002 | Forbes | 713/323 |

OTHER PUBLICATIONS

"Intel 82801AA (ICH) & Intel 82801AB (ICH0) I/O Controller Hub AC '97, Programmers's Reference Manual", Dec. 1999.*

INTEL Corporation, "Audio Codec '97". Revision 2.1; May 22, 1998, pp 1–108.

* cited by examiner

Primary Examiner—Thomas Lee
Assistant Examiner—Albert Wang
(74) Attorney, Agent, or Firm—Blakely, Sokoloff, Taylor & Zafman LLP

(57) ABSTRACT

A wake up circuit for a computer system with a codec controller. The circuit provides a wakeup signal to the computer system when a codec detects an event that requires the system to become active. This signal is provided whether the communications link between the codecs and their controller is active or inactive. When the link is inactive, as indicated by the absence of a bit clock, a data signal on any of the codec input lines triggers the controller to send a power activation signal to the system and to initiate an activation of the codec link. If the link is already active, the general purpose input status change bit is transmitted to the controller, which writes it into a register that is used to trigger a power activation signal to the system. An enable input permits the wakeup signal to be enabled or disabled under program control. The wakeup signal can be used to trigger a system management interrupt or other interrupt suitable for initiating a system resume function.

16 Claims, 3 Drawing Sheets

WAKEUP CIRCUIT FOR COMPUTER SYSTEM THAT ENABLES CODEC CONTROLLER TO GENERATE SYSTEM INTERRUPT IN RESPONSE TO DETECTION OF A WAKE EVENT BY A CODEC

BACKGROUND OF THE INVENTION

1. Field of the Invention

The invention pertains generally to a power control circuit. More particularly, it pertains to a wake up circuit for a computer system with a codec.

2. Description of the Related Art

A number of methods have been developed for reducing power consumption in a computer system by shutting down various portions of the system. This is commonly done by putting one or more selected circuits into a sleep mode from which the circuits may be awakened. Sleep modes can involve shutting off power to a circuit, but are more commonly implemented by leaving power on and stopping all clock activity, which reduces power consumption significantly and has the advantage of preserving context information. Industry standards have been developed to define various levels of sleep states. Sleep states for devices are defined by states D0 through D3, where D0 is fully active and operational, and D3 is completely off with no preservation of context information. Sleep states for computer systems are defined by states S0 through S5, where S0 is fully operational, and S5 is completely off with no preservation of context information. Systems and their connected devices can be put into sleep states independently. A device that is not being used can be put into a sleep state while the system continues to operate. Alternately, a system with no current tasks to perform can be put into a sleep state, but the devices that are supposed to detect wake events must remain at least partially active so that they can detect those events and trigger a wakeup sequence in the system.

Many areas of computer technology have well developed sleep/wakeup provisions. An area that is not well developed, however, is the area of codec interfaces. One common codec design separates the analog functions from the digital functions by defining analog codecs connected over a bus link to a digital codec controller. Sleep modes for the codecs are well defined, allowing these peripheral areas to be shut down for power saving and reawakened by the system as needed. If there is no codec activity, the codec bus can also be shut down. However, if the system itself is put into a sleep mode, a codec that detects a wakeup event must convey a wakeup signal to the system, whether the codec bus is active or not. In conventional systems, there is no satisfactory process defined for generating a wakeup signal under both conditions.

FIG. 1 shows a block diagram of a conventional system 1, having a single digital controller 10 controlling primary codec 11 and secondary codec 12, and with provisions for up to four codecs per controller. Controller 10 can interface with a processor system over bus 30. After being set up by the processor, controller 10 acts as a direct memory access (DMA) controller, transferring codec data directly to and from memory without further intervention by the processor. Four of the interconnecting lines on bus link 19 are shared, while each codec has its own individual DATA_IN line for data inputs to the controller. Primary codec 11 outputs a bit clock on line 14, which is used to synchronize signal transitions on all the other lines of link 19. The SYNC signal on line 13 is used to define the start of data frames. As long as BIT_CLK is active, SYNC will be active and bus link 19 is considered active. Controller 10 can direct primary codec 11 to stop the bit clock, thus putting the bus into a sleep state. Under this condition, any codec can request a bus activation by raising its DATA_IN line and keeping it high, which causes controller 10 to generate a power management signal to the system so that a system wakeup sequence can be started. Once the system becomes operational, it directs the controller to generate a SYNC signal on the codec bus, which in turn causes the requesting codec to drop its DATA_IN line and causes the primary codec to resume the bit clock. Once the system and codec bus are both awake, the system can interact with the codec that initiated this sequence to determine what the wakeup event was and how to deal with it.

However, if the system is in a sleep mode but the codec bus is still active, raising the DATA_IN line does not trigger the above events, and there is no defined way for a codec to trigger the power management interrupt.

SUMMARY OF THE INVENTION

The invention includes a wakeup circuit with a data input for receiving a data input signal from a codec, a clock status input for receiving a clock status signal, and a device status input for receiving a device status signal. It also includes a wakeup status output for transmitting a wakeup status signal. The wakeup status signal is asserted if the device status signal is asserted. The wakeup status signal is also asserted if the clock status input signal is not asserted and the data input signal is asserted.

DETAILED DESCRIPTION OF THE INVENTION

The invention enables the codec controller to generate a power management signal to the system in response to detection of a wake event by a codec, regardless of whether the codec bus is active or inactive. Once the system receives the power management signal, it can awaken and respond to the event. In one embodiment, the computer is awakened by triggering a system interrupt with the power management signal.

Figure 1:
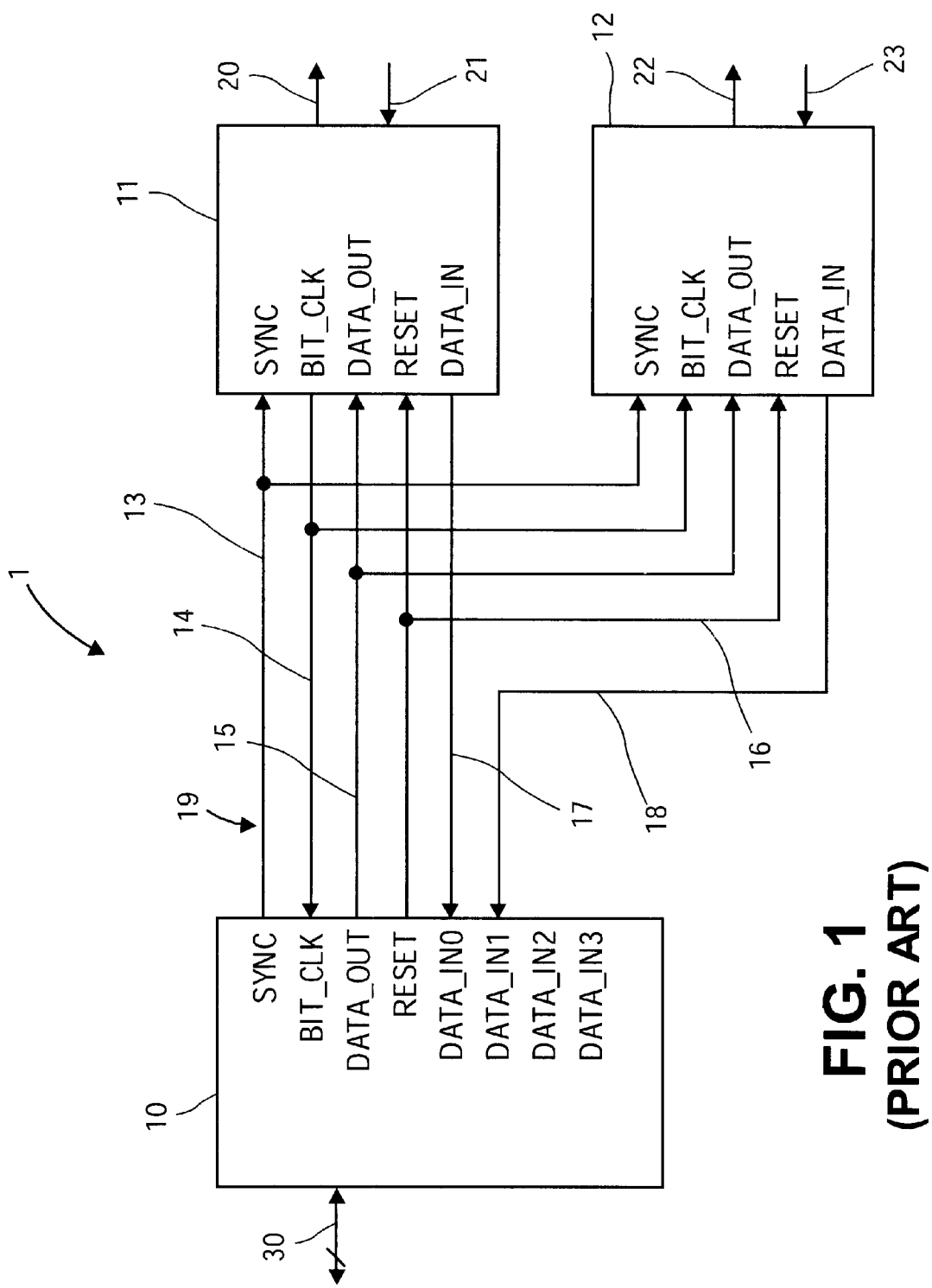
FIG. 1 shows a system of the prior art.

FIG. 1 shows a conventional implementation, an example of which can be found in the specification Audio Codec '97, Revision 2.1, published May 22, 1998. Each codec 11, 12 is an application-specific device with an analog interface, which may include analog outputs 20, 22 and analog inputs 21, 23. In the case of an audio codec, output 20 can be amplified and used to drive speakers, while input 21 can receive signals from a microphone or some other audio source device such as a compact disk unit. In the case of a modem codec, output 22 can be used as a modem output to drive signals over a telephone circuit, while input 23 can be used as a modem input to receive similar signals over the telephone circuit from a remote modem.

Controller 10 communicates with the codecs over link 19, which is composed of the four shared signal lines 13–16, and a separate DATA_IN line 17, 18 from each codec. Data is communicated over the DATA_IN and DATA_OUT lines in predefined frames, each frame consisting of a number of predefined time slots, each slot having a predefined number of bits. Each frame is a transmission to or from a single codec. Since up to four codecs can be handled by one controller, communication is handled in a time-division multiplex (TDM) mode, with a frame repetition rate of 48 kHz. This frame rate is controlled by controller 10, which signifies the start of a new frame by beginning a new sync signal on SYNC line 13 every 20.8 microseconds. Controller 10 also outputs the RESET signal on line 16, which is used to initialize the codecs to a known state.

The bit clock, designated as BIT_CLK on line 14, is generated by primary codec 11. This clock runs at 12.288 MHz, and is used by all other devices on bus 19 (including the controller) for bit synchronization on the SYNC, DATA_IN and DATA_OUT lines. DATA_OUT line 15 conveys a serial bit stream from controller 15 to the codecs. DATA_IN0 line 17 conveys a serial data bit stream from primary codec 11 to controller 10, while DATA_IN1 line 18 conveys a serial data bit stream from secondary codec 12 to controller 10. Controller 10 also has two other DATA_IN inputs to accommodate up to four codecs.

If there is no link activity for a predetermined period of time (or if the system decides to stop all codec communications for some other reason), controller 10 may send a power-down message to codec 11, which will stop the bit clock and put bus 19 into an inactive state. Codec 11 will reactivate the bit clock, allowing communications to resume, whenever controller 10 asserts either the SYNC or RESET signals. A SYNC signal, in the absence of a bit clock, causes the primary codec to resume the bit clock and causes all the codecs to perform a warm start, becoming operational by using the data that has been preserved in their registers. A RESET signal has a similar effect, but causes the codecs to perform a cold start, in which they initialize their registers and begin processing from a predefined starting point.

In operation, a wakeup sequence will go through one of two sequences depending on whether link 19 is active or inactive.

Figure 2:
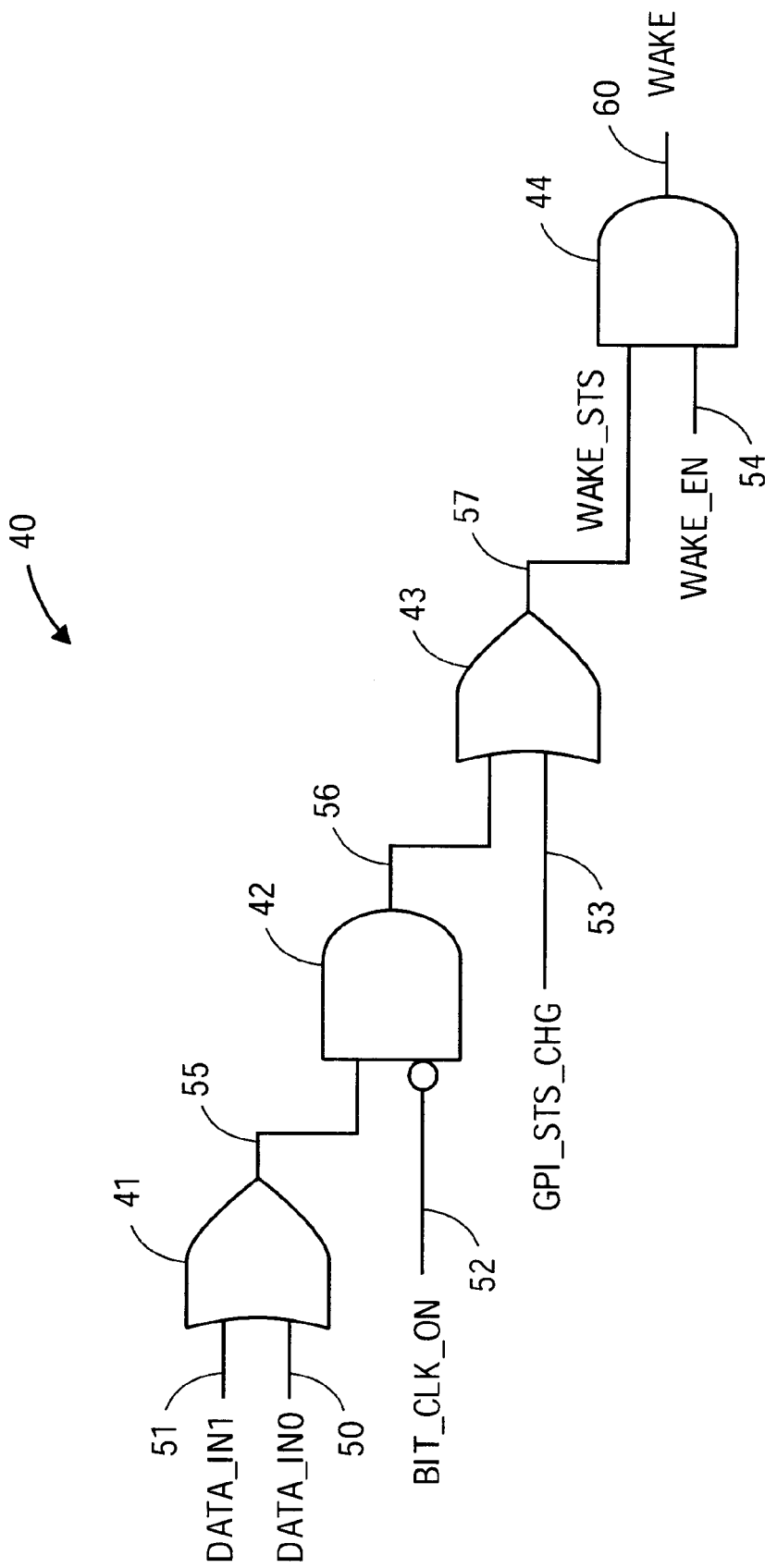
FIG. 2 shows a wakeup circuit.

If link 19 is active, a codec sensing a wake event can notify controller 10 of this condition by writing a '1' into bit 0 of slot 12. Controller 10 writes this bit into the General Purpose Input Output (GPIO) status register every time it receives a slot 12. When this status bit in the register is asserted as a logic '1', it asserts the device status signal GPI_STS_CHG on line 53 as shown in FIG. 2. As previously described, a logic '1' on line 53 produces a logic '1' for the wakeup status signal on line 57. If the wake up circuit has been enabled by asserting WAKE_EN, then the WAKE signal on line 60 is asserted to tell the system to wake up. The system can then activate all necessary processing to determine the source of the wakeup condition and the proper method of handling it. In one embodiment, this WAKE signal is used to trigger a system control interrupt (SCI) or system management interrupt (SMI), causing the system to awaken and respond. If desired, the WAKE signal can also be disabled by disabling the WAKE_EN signal.

If link 19 is inactive, a codec sensing a wake event cannot notify the system directly because no data can be transferred over an inactive link. Following conventional protocol, the codec indicates a wake condition by raising its DATA_IN line to controller 10. Controller 10 responds by asserting a signal to the system telling it to wake up. In one embodiment, this is a power management event (PME) interrupt. The system initiates whatever system wakeup functions are necessary, and also directs controller 10 to activate link 19, which it does by pulsing the SYNC line on link 19. A SYNC pulse on an inactive link tells the primary codec to start the bit clock. Link 19 is now active, and controller 10 will place sync pulses on the SYNC line at a 48 KHz rate, permitting data to flow over the link in the normal manner. The codec that sensed the wake event can now send a message to controller 10, more fully defining the wake event so that the proper processing can be initiated.

Figure 3:
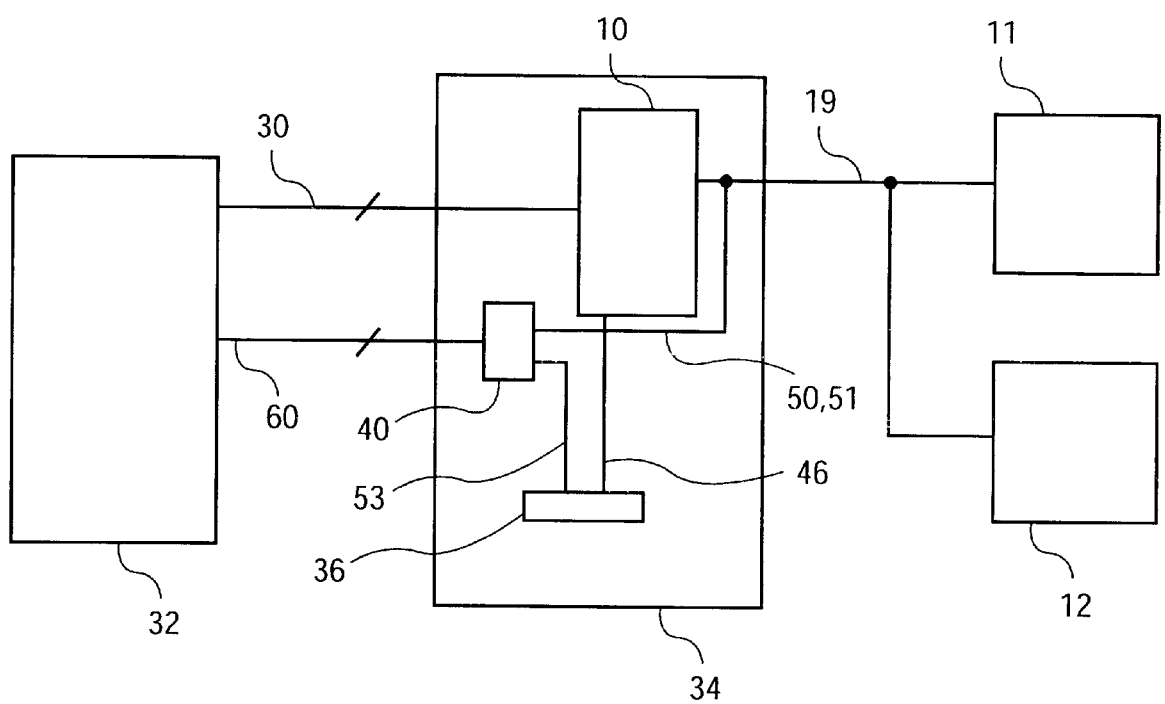
FIG. 3 shows a system containing the wakeup circuit

FIG. 3 shows a system level block diagram of the invention. Wakeup circuit 40 and controller 10 can be contained within an Input-Output Control Hub (ICH) 34. Register 36 contains a GPI_STS_CHG bit that is used by wakeup circuit 40. This register bit can be updated by controller 10 over line 46 whenever controller 10 receives a transmission over link 19 containing this status bit. In one embodiment, this status bit is contained in bit 0 of slot 12 of the input transmissions from the codecs. The DATA_IN signals on link 19 are connected to wakeup circuit 40 over lines 50, 51. The WAKE signal that triggers a system wakeup is transmitted from wakeup circuit 40 to system 32 over line 60. In one embodiment, this signal is in the form of a system interrupt.

When either of codecs 11, 12 detects that a wake event has occurred, that codec raises its DATA_IN line, so that one the input lines 50, 51 to OR gate 41 will go high, causing input line 55 to AND gate 42 to go high. The output of gate 42 will then go high only if line 52 is low. The BIT_CLK_ON signal on line 52 is a clock status signal that indicates whether the link is active by going high if the bit clock is present on line 14, and low if it is not present. If the link is inactive, the low signal on line 52 enables the output of AND gate 42 to go high on line 56. This signal will then be passed through OR gate 43 to assert the wakeup status signal WAKE_STS on line 57. WAKE_STS is the signal that indicates a codec has detected a wake event and passed that information to controller 10. Controller 10 will send that signal to the system if it has been enabled to do so by asserting the wakeup enable signal WAKE_EN. Thus, if any codec raises its DATA_IN line when link 19 is inactive, the wakeup signal WAKE_STS will be asserted, and will be forwarded to the system if enabled. Although only two DATA_IN inputs are shown, OR gate 41 might have up to four such inputs to accommodate up to four codecs on link 19.

Alternately, a high GPI_STS_CHG signal on line 53 will always generate a high signal on line 57 and raise the WAKE_STS signal. GPI_STS_CHG indicates an input status change that is signaled by the General Purpose Input/Output (GPIO) bit. This is a status bit that is transferred over the link in bit 0 of frame 12 and can be programmed to represent various input/output conditions. The GPI_STS_CHG bit is stored in a register that is updated every time an input frame is received by controller 10. Since frames can only be transferred when the bit clock is active, the GPI_STS_CHG signal can only become asserted when clock status signal BIT_CLK_ON is asserted and a change in GPI_STS_CHG is transferred over link 19.

Thus, a wakeup event can be signaled by the WAKE_STS signal in two ways. If the link is inactive, the event will be signaled when any codec on link 19 raises its DATA_IN line. If link 19 is active, the event will be signaled when a codec transmits a status change in an input transmission, and this change is written into a GPI_STS_CHG register bit by controller 10.

Each codec can be designed to recognize various events as wake events. In one embodiment, a modem codec treats a ring condition as a wake event. In another, an audio codec detects a wake event when a signal at its analog input exceeds a predefined amplitude, such as when the volume of sound received by a microphone exceeds a predetermined threshold. In another embodiment, an audio codec detects a wake event when a signal at its analog input has a predefined wave shape, such as when a predetermined word is spoken into a microphone. These and other trigger conditions can be combined in the same system. One embodiment of the system uses an audio codec as the primary codec and a modem codec as the secondary codec. Another embodiment includes a single audio/modem codec capable of performing both audio and modem functions.

The WAKE_EN signal at line 54 serves as a programmable control for enabling the wakeup signal WAKE on line 60. It can be programmed by any higher-level function, such as by the processor or by the ICH. If WAKE_EN is low, the WAKE signal on line 60 will be disabled and no wakeup signal can be generated by AND gate 44. If WAKE_EN is high, gate 44 is allowed to pass the WAKE_STS signal to its output, and the WAKE signal will be generated if WAKE_STS is high.

The foregoing description is intended to be illustrative and not limiting. Other variations will occur to those of skill in the art. Such variations are intended to be encompassed by the invention, which is limited only by the spirit and scope of the appended claims.

We claim:

1. A wakeup circuit, comprising:
   a data circuit with a first data input to receive a first data input signal from a first codec;
   a clock status circuit with a first clock status input to receive a clock status signal and a second clock status input coupled to an output of the data circuit;
   a device status circuit with a first device status input to receive a device status signal and a second device status input coupled to an output of the clock status circuit; and
   a wakeup status circuit with a first wakeup status input coupled to an output of the device status circuit to receive a wakeup status signal, and a wakeup status output to assert a wakeup signal if said device status signal is asserted and to assert said wakeup status signal if said clock status input signal is not asserted and said first data input signal is asserted.

2. The circuit of claim 1, wherein the wakeup status circuit further includes:
   a second wakeup status input to receive a wakeup enable signal;
   wherein said wakeup signal is asserted only if said wakeup enable signal is asserted and said wakeup status signal is asserted.

3. The circuit of claim 1, wherein the clock status signal indicates if a codec bit clock is active.

4. The circuit of claim 1, wherein the codec is one of an audio codec, a modem codec, and an audio/modem codec.

5. The circuit of claim 1, wherein the data circuit further includes a second data input to receive a second data input signal from a second codec, wherein said wakeup status signal is asserted if said clock status input signal is not asserted and at least one of said first and second data input signals is asserted.

6. The circuit of claim 5, wherein the first codec is an audio codec and the second codec is a modem codec.

7. A wakeup system for a computer, comprising:
   a computer system;
   a codec controller coupled to the computer system;
   a first codec coupled to the codec controller through a codec link;
   a status register coupled to the codec controller;
   a wakeup circuit coupled to the status register and the codec link, said wakeup circuit including:
      a data circuit with a first data input to receive a first data input signal from a first codec;
      a clock status circuit with a first clock status input to receive a clock status signal and a second clock status input coupled to an output of the data circuit;
      a device status circuit with a first device status input to receive a device status signal and a second device status input coupled to an output of the clock status circuit; and
      a wakeup status circuit with a first wakeup status input coupled to an output of the device status circuit to receive a wakeup status signal, and a wakeup status output to assert a wakeup signal if said device status signal is asserted and to assert said wakeup status signal if said clock status input signal is not asserted and said first data input signal is asserted.

8. The circuit of claim 7, wherein the wakeup status circuit further includes:
   a second wakeup status input to receive a wakeup enable signal;
   wherein said wakeup signal is asserted only if said wakeup enable signal is asserted and said wakeup status signal is asserted.

9. The circuit of claim 7, wherein the clock status signal indicates if a codec bit clock in said codec link is active.

10. The circuit of claim 7, wherein the first codec is one of an audio codec, a modem codec, and an audio/modem codec.

11. The circuit of claim 7, further comprising a second data input for receiving a second data input signal from a second codec, wherein said wakeup status signal is asserted if said clock status input signal is not asserted and one of said first and second data input signals is asserted.

12. The circuit of claim 11, wherein the first codec is an audio codec and the second codec is a modem codec.

13. A method of waking a computer system, comprising:
   detecting a wake event by a codec;
   transmitting a status bit in a data transmission from the codec to a codec controller;
   receiving the data transmission by the codec controller;
   writing the status bit into a register;
   generating a wakeup signal if the status bit in the register has a predetermined state;
   generating a system interrupt; and
   waking up the computer system.

14. The method of claim 13, wherein transmitting includes transmitting the status bit in a predefined bit of a predefined slot of a data frame.

15. The method of claim 14, the predefined slot is slot 12 and the predefined bit is bit 0.

16. The method of claim 13, wherein detecting a wake event includes detecting at least one of:
   a modem ring indication;
   a minimum analog amplitude indication; and
   an analog waveform match indication.

* * * * *